United States Patent [19]

Wickersheim et al.

[11] Patent Number: 4,626,110

[45] Date of Patent: Dec. 2, 1986

[54] TECHNIQUE FOR OPTICALLY MEASURING THE TEMPERATURE OF AN ULTRASONICALLY HEATED OBJECT

[75] Inventors: Kenneth A. Wickersheim, Menlo Park; Mei H. Sun, Los Altos, both of Calif.

[73] Assignee: Luxtron Corporation, Mountain View, Calif.

[21] Appl. No.: 730,299

[22] Filed: May 3, 1985

[51] Int. Cl.[4] .................. G01J 5/08; G01K 11/20; G01K 13/00

[52] U.S. Cl. ................................. 374/131; 374/159; 374/161; 128/736

[58] Field of Search ............... 374/130, 131, 159, 161; 128/736, 804; 433/86

[56] References Cited

U.S. PATENT DOCUMENTS

| | | | |
|---|---|---|---|
| 4,016,761 | 4/1977 | Rozzell | 374/161 |
| 4,136,566 | 1/1979 | Christensen | 374/161 |
| 4,140,393 | 2/1979 | Cetas | 356/43 |
| 4,223,226 | 9/1980 | Quick et al. | 250/458 |
| 4,245,507 | 1/1981 | Samulski | 356/44 |
| 4,253,469 | 3/1981 | Aslan | 128/736 |
| 4,376,890 | 3/1983 | Engström et al. | 250/277 |
| 4,397,314 | 8/1983 | Vaguine | 128/804 |
| 4,448,547 | 5/1984 | Wickersheim | 374/131 |

OTHER PUBLICATIONS

Fessenden et al., "Direct Temperature Measurement," *Cancer Research* (Suppl.), vol. 44, Oct. 1984, pp. 4799s–4804s.
Hynynen et al., *The British Journal of Radiology*, vol. 56, Dec. 1983, pp. 969–970.
Papoutsis, "Fiber Optic Trends: Keeping the Heat on Cancer," *Photonics Spectra*, Mar. 1984, pp. 53–59.
Lagakos et al., "Optical Fibers with Reduced Pressure Sensitivity," *Optics Letters*, vol. 6, No. 9, Sep. 1981, pp. 443–445.
Fry and Fry, *Journal of the Acoustical Society of America*, vol. 26, No. 3, May 1954, pp. 311–317.
Christensen, *Journal of Bioengineering*, vol. 1, 1977, pp. 541–545.

*Primary Examiner*—Charles Frankfort
*Assistant Examiner*—Thomas B. Will
*Attorney, Agent, or Firm*—Majestic, Gallagher, Parsons & Siebert

[57] ABSTRACT

An optical fiber temperature sensing probe is implanted into a human body or other object that is being heated, either by ultrasonic radiation alone or by a combination of ultrasonic and electromagnetic (radio frequency or microwave) energy. In order to measure temperature in an ultrasound field without the probe introducing errors, the probe is made to be substantially thermally non-conducting, made of materials that do not absorb compressional energy, and has a small diameter relative to the length of the ultrasonic heating waves.

15 Claims, 3 Drawing Figures

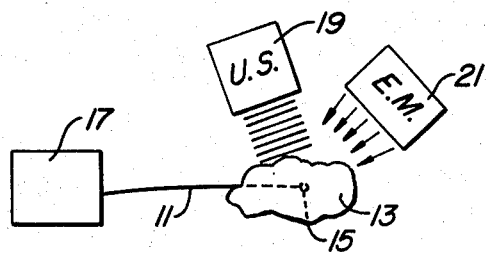
FIG._1.
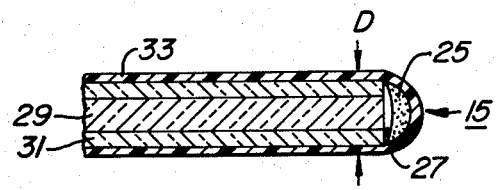
FIG._2.
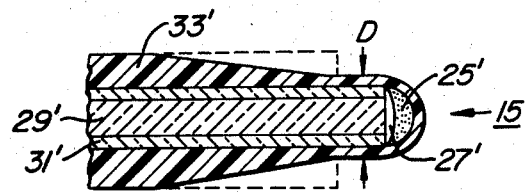
FIG._3.

TECHNIQUE FOR OPTICALLY MEASURING THE TEMPERATURE OF AN ULTRASONICALLY HEATED OBJECT

BACKGROUND OF THE INVENTION

This invention relates generally to optical temperature sensing techniques, and more specifically to such techniques applied to measure the internal temperature of objects being heated by electromagnetic radiation and/or ultrasonic energy.

There are many applications where the internal temperature of a fluid bath or more solid object is to be measured in an electromagnetic radiation and/or ultrasonic energy field that is heating the object. One such application is in the emerging field of medical hyperthermia, where tumors and cancerous tissue within a human body are heated by an external source as part of a program of medical treatment. For such treatment, the tumor is maintained at a pre-determined elevated temperature for a pre-determined period of time by directing electromagnetic radiation, in either the radio frequency or microwave spectrums, and/or ultrasonic energy from outside the body into the tumor.

In order to assure that the material being heated in this way is maintained at the desired temperature, a non-obtrusive temperature sensor is implanted in the material. In the case of cancer treatment of the human patient, such a sensor is surgically implanted in the region to be heated prior to beginning the heating. Very small thermocouples and thermistors are traditionally used with either ultrasonic energy or electromagnetic radiation heating. More recently, optical fiber temperature sensors are being employed to measure the temperature of materials heated by electromagnetic radiation. A significant advantage of the newer optical sensors is that they do not include electrically conducting materials, thereby eliminating heating of the sensor that can result from the use of thermocouples and thermistors as the result of electrical currents induced by the electromagnetic energy field. A significant source of error is thus eliminated. Since this problem of induced current does not exist with ultrasonic heating, however, thermocouples and thermistors remain the technique of choice for that type of heating.

It is a primary object of the present invention to provide an optical temperature sensing probe that may be used with a variety of specific types of heating without introducing excessive errors.

SUMMARY OF THE INVENTION

This and additional objects are accomplished by the various aspects of the present invention, wherein, very briefly, an optical temperature sensor is held at an end of an optical fiber to form a probe made of substantially non-compressible materials, having very low thermal conductivity along its length, and having a diameter that is very small. Such a probe is especially adapted for use in an ultrasonic heating field, without introducing an excessive level erroneous temperature artifacts that are unrelated to the temperature of the material in which the probe is implanted.

By being made of substantially non-compressible materials, the probe does not directly absorb significant radiation, so it is not significantly heated independent of the surrounding material. The very low thermal conductivity assures that heat is not conducted away from the temperature sensor, a source of temperature reading error present in other techniques. The small size, significantly less in diameter than the wavelength of the irradiating ultrasound in the heated material when divided by the mathematical constant pi, minimizes scattering of the ultrasound and frictional heating of the probe resulting from movement relative to the surrounding material.

Such a probe is also useful in an electromagnetic radiation field, thereby making it possible to use a single sensor implantation for simultaneous or successive heatings by ultrasonc and/or electromagnetic techniques.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1 schematically illustrates a typical heating and temperature measurement system;

FIG. 2 is a cross-sectional view of a temperature sensing probe according to one embodiment of the present invention that can be employed in the system of FIG. 1; and FIG. 3 is a cross-sectional view of a temperature sensing probe according to another embodiment of the present invention that can be employed in the system of FIG. 1.

DESCRIPTION OF THE PREFERRED EMBODIMENTS

Referring to FIG. 1, an example is given of an environment in which the improved temperature sensing probes of the present invention are useful. A length of an optical fiber transmission medium 11, including one or a plurality of optical fibers, extends between an object 13, whose temperature is to be measured, and an instrument 17 that detects optical signals and provides such a measurement. A temperature sensor 15 is located at or near an end of the fiber transmission medium 11 and in optical communication therewith. In the embodiments illustrated, the sensor 15 is physically attached to the end of the fiber medium 11. The sensor 15 has some temperature dependent optical characteristic that is detected and measured by the instrument 17. The sensor 15 and a portion of that end of the fiber medium 11 are implanted or immersed in the medium or object 13 in order to measure its internal temperature. The medium or object 13 is heated by either an ultrasonic compressional wave energy source 19 or an electromagnetic radiation source 21, or both at the same or successive times.

The improved temperature sensing devices and techniques of the present invention are not dependent upon the particular type of sensor 15 that is employed. Any one of many optical temperature sensors known in the art may be used. One class of such sensors utilizes a luminescent material. It is excited to luminescence by excitation radiation being directed down the fiber and temperature dependent luminescence is thus passed back through the fiber to the measuring instrument. The following two patents describe such a system which measures temperature dependent luminescence intensity: U.S. Pat. Nos. 4,448,547—Wickersheim (1984), and 4,376,890—Engstrom et. al. (1983). The following two patents describe a system which measures the temperature-dependent decay time of luminescence: U.S. Pat.

Nos. 4,245,507—Samulski (1981), and 4,223,226—Quick et al. (1980). Other types of devices rely upon temperature dependent absorption, reflectance or polarization, as exemplified, respectively, by the following patents: U.S. Pat. Nos. 4,136,566—Christensen (1979), 4,016,761—Rozzell (1977),and 4,140,393—Cetas (1979).

Regardless of the particular optical temperature sensing technique utilized, the present invention contemplates a physical structure of a temperature probe that is particularly useful in ultrasonic fields to make temperature measurements with high accuracy, as well as similarly being useful in electromagnetic radiation heating fields with similar accuracy. Such a structure is of great advantage in human hyperthermia where heating of internal body tissue or tumors may be accomplished by either form of radiation, and in some cases both at the same time. Often, a treating physician may not know in advance of surgically implanting the temperature sensing probe whether it is best to perform the heating by use of ultrasound or electromagnetic radiation. This may only be determined after a few temperature readings are taken by heating with one or the other. A very ill patient can not withstand removal of one type of temperature probe and a subsequent surgical implantation of another type when the type of heating radiation is changed. Yet, that is the current practice, since available sensors used in electromagnetic radiation fields without generating temperature artifacts of an unacceptable level are not as accurate in an ultrasound field. This is because of their heating through absorption of ultrasound, size, thermal conductivity, or some other reason.

Referring to FIG. 2, an embodiment of a temperature probe according to the present invention is described. A temperature sensor 25 is attached by a layer of optically transparent adhesive 27 to an end of an optical fiber length, the optical fiber including a core portion 29, a surrounding cladding 31 and a pigmented protective coating 33. In the example being described, the sensor 25 is a powdered luminescent material that is dispersed in an optically clear binder.

All of the materials chosen for the probe of FIG. 2 are substantially non-electrically conductive, substantially non-thermally conductive, and substantially non-absorptive of ultrasound radiation. In order to be substantially non-absorptive of ultrasound, the materials need to be hard. Absorption by plastic jackets, such as Teflon and the like, of existing probes has been found to be a significant cause of undesired probe heating. Substantially non-absorptive materials reduce that cause of heating which is unrelated to the temperature of the material in which the probe is implanted. As a result of having very low thermal conductivity, heat is not removed from the sensor through the optical fiber probe, thus eliminating another source of temperature reading error. By the materials being substantially non-electrically conductive, the probe is also useful in an electromagnetic energy field.

The absolute amounts of thermal conductivity and sound absorption of the implanted sensor and fiber medium that can be withstood in a particular application depends, of course, upon the accuracy that is required of the temperature measurements, and also upon those characteristics of the medium in which the sensor is implanted. It is desired that the implanted device not have a significantly higher absorption or conductivity than that of the medium.

It has also been discovered that undesired temperature artifacts are present in an optical temperature probe in an ultrasound field when its diameter or other cross-sectional dimension is large enough with respect to the length of the ultrasound waves that movement occurs between the sensor and the material being measured. Resulting friction elevates the temperature of the sensor and the immediately surrounding material, but it is not representative of an unobtrusive measurement of the material temperature, and thus produces an error.

It is known that ultrasound incident upon an infinite cylinder will apply sideward force to the cylinder that is a maximum when its diameter is approximately equal to the length of the ultrasonic waves divided by the mathematical constant pi (3.1416). It has also been found that frictional heating of the implanted fiber end and sensor decrease when the diameter decreases below this ratio. Therefore, the diameter D is preferably made to be significantly less than the length of the ultrasonic waves in a medium for which the probe is designed to be used, when divided by pi. The results get better as the diameter decreases.

Commonly used ultrasonic heating frequencies in human hyperthermia extend from 300 KHz. to approximately 6 MHz., a range of from 500 KHz. to 2 MHz. being more prevalent. The particular frequency chosen by a treating physician depends primarily upon the anatomy of the patient and the nature of the area to be heated. Most commonly used frequencies are 1 and 2 MHz., having a wavelength of 1.5 and 0.75 mm, respectively, in human tissue. Even though in excess of the ratio discussed above for the higher frequencies of this range, a diameter D of 0.3 mm has been found to produce temperature artifacts no larger than that of a good thermocouple or thermistor at these commonly used frequencies. Actual test data for such a sensor is presented in a poster paper entitled "Ultrasound-Immune Fiberoptic Thermometry Probe" given by applicants herein and others at the Annual Meeting of the Radiation Research Society, May 5–9, 1985, which paper is incorporated by reference herein.

There are many specific materials that meet the hardness criterion described for the probe of FIG. 2. Example materials include the use of fused quartz (silica) for the fiber core 29 and cladding 31, the cladding being doped to have a different refractive index than the core 29. Glass can alternately be used. The cladding 31 can, instead, be made of a thin noncompressible plastic or other material.

The negligible amount of binder which holds the luminescent material particles in the form of sensor 25 is a clear, hard silicone resin, and the adhesive layer 27 is a thin, hard layer of silicone adhesive. The coating 33 is a thin layer of polyimide that has a pigment added to render the probe light tight. Such a coating is also biocompatible, important for human hyperthermia applications. Another reason for the coating is to add physical strength to the probe and support for the sensor. Since the coated fiber materials are not electrically conductive, a thick coating for the purpose of providing electrical insulation is not required.

Because of the small probe size and brittle nature of some preferred materials, such as silica, the potential of probe breakage during the implantation exists for some applications. But the small size is most important at the sensor 15 and adjacent to it, so it is possible to increase the fiber medium diameter beginning a short distance away from the sensor, if added strength is desired, without significantly affecting the level of undesired temperature artifacts. This increased diameter can be provided by use of a larger fiber or thicker coating. As illustrated in the embodiment of FIG. 3, the thin coating 33 is retained around the temperature sensor 25 and the coating's thickness is increased beginning a small distance from the sensor along the length of the fiber medium. The gradual increase in thickness there illustrated is preferable, although a more rapid increase in thickness as illustrated in dashed outline could also be employed. The rapid change of thickness, however, has a disadvantage of concentrating bending stresses, which could contribute to breaking, and also of making it somewhat more difficult to implant in the medium whose temperature is to be measured.

The examples of FIGS. 2 and 3 show temperature sensing probes of a single fiber, but, as the abovereferenced patents show, some techniques may make it desirable or a requirement to employ two or more independent fibers terminating in a single sensor. In such a case, the cross-sectional dimensions discussed above apply to the entire, composite structure. Further, it may be desirable to provide a linear array of multiple sensors at ends of independent fibers, either in a single jacket of the small overall dimensions discussed above, or as independent fibers of such dimensions with their sensors all positioned in the same general region of the medium.

Although the various aspects of the present invention have been described with respect to a preferred embodiment thereof, it will be understood that the invention is entitled to protection within the full scope of the appended claims.

It is claimed:

1. A method of monitoring the temperature of a volume of material that is being heated by absorption of ultrasonic energy being directed into said volume of material from its outside, comprising the steps of:
   implanting within said material one end of an optical fiber transmission medium which carries an optical temperature sensor, said sensor and optical transmission medium adjacent said sensor being characterized by being made substantially entirely of non-compressible material and having an outer diameter that is substantially equal to or less than a wavelength of said ultrasonic energy in said material divided by the mathematical constant pi, and
   monitoring the temperature of said sensor through connection with another end of said optical fiber transmission medium;
   whereby temperature artifacts that tend to be caused by ultrasonic energy interaction with the temperature sensor are minimized.

2. The method according to claim 1 wherein said sensor and optical transmission medium adjacent said sensor are further characterized by said outer diameter being substantially equal to or less than 0.3 millimeter.

3. The method according to claim 1 wherein said optical transmission medium adjacent said sensor is further characterized by a diameter along its length beginning a distance from said sensor that is significantly greater than said outer diameter, thereby to add strength to the fiber structure.

4. The method according to claim 1 which comprises an additional step of simultaneously irradiating said volume of material with electromagnetic radiation, thereby heating said volume both ultrasonically and electromagnetically, whereby the step of monitoring the temperature of said volume detects heating from both the ultrasonic and electromagnetic sources.

5. The method according to claim 1 wherein said volume of material is within a human body.

6. The method according to claim 1 wherein said optical transmission medium is further characterized by having a core and cladding made of quartz and a jacket of a non-compressible material.

7. The method according to claim 1 wherein said optical transmission medium is further characterized by being thermally non-conductive.

8. A temperature sensing probe especially adapted for being implanted into a volume of material that is being heated by absorption of ultrasonic energy being directed into said volume from its outside, comprising an optical temperature sensor attached to one end of an optical fiber transmission medium, said sensor and optical transmission medium immediately adjacent said sensor being characterized by (1) having an outer diameter that is significantly less than a wavelength of said ultrasonic energy in said material divided by the mathematical constant pi, (2) being substantially thermally non-conductive, and (3) being made of substantially non-compressible materials thereby to minimize temperature artifacts that tend to be caused by ultrasonic interaction with the temperature sensing probe.

9. The probe according to claim 8 wherein said sensor and optical fiber transmission medium are additionally characterized by being substantially non-electrically conductive, whereby said probe is also useful when said volume of material is heated with electromagnetic radiation.

10. The probe according to claim 8 wherein said sensor and optical fiber transmission medium include a coating thereover that is characterized by being biocompatible, whereby said probe is adapted for being implanted in a human body as said volume of material.

11. The probe according to claim 10 wherein said coating consists essentially of a polyimide.

12. The probe according to claim 8 wherein said optical fiber transmission medium is further characterized by having a core and cladding made of quartz, and a jacket surrounding said cladding and sensor that is substantially optically opaque and made of a non-compressible material.

13. The probe according to claim 12 wherein said jacket consists essentially of a polyimide.

14. The probe according to claim 12 wherein said jacket is a first thickness adjacent said sensor and for a distance along the length of said fiber medium therefrom, said jacket gradually increasing in thickness, beginning at said distance from said sensor, until it is a second thickness much greater than said first thickness, whereby strength is added to the fiber transmission medium where the added thickness thereof does not interfere with ultrasonic energy that heats the volume of material in which the probe is adapted to be inserted.

15. The probe according to claim 8 wherein said sensor and fiber transmission medium are additionally characterized by said outer diameter being substantially equal to or less than 0.3 millimeter.

* * * * *